United States Patent
Narayan et al.

(10) Patent No.: US 11,023,807 B2
(45) Date of Patent: Jun. 1, 2021

(54) NEURAL NETWORK PROCESSOR

(71) Applicant: Microsoft Technology Licensing, LLC, Redmond, WA (US)

(72) Inventors: Shankar S. Narayan, Redmond, WA (US); Ryan S. Haraden, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 929 days.

(21) Appl. No.: 15/674,936

(22) Filed: Aug. 11, 2017

(65) Prior Publication Data
US 2018/0189649 A1  Jul. 5, 2018

Related U.S. Application Data

(60) Provisional application No. 62/440,655, filed on Dec. 30, 2016.

(51) Int. Cl.
| | |
|---|---|
| G06N 3/08 | (2006.01) |
| G06N 3/04 | (2006.01) |
| G06F 7/544 | (2006.01) |
| G06F 1/3234 | (2019.01) |
| G06N 3/063 | (2006.01) |
| G06F 1/3287 | (2019.01) |
| G06F 9/30 | (2018.01) |
| G06F 9/38 | (2018.01) |

(52) U.S. Cl.
CPC ............. *G06N 3/08* (2013.01); *G06F 1/3243* (2013.01); *G06F 7/5443* (2013.01); *G06N 3/04* (2013.01); *G06N 3/063* (2013.01); *G06F 1/3287* (2013.01); *G06F 9/3004* (2013.01); *G06F 9/3887* (2013.01); *G06F 2207/4824* (2013.01)

(58) Field of Classification Search
None
See application file for complete search history.

(56) References Cited

U.S. PATENT DOCUMENTS

| | | |
|---|---|---|
| 5,325,464 A | 6/1994 | Pechanek et al. |
| 2014/0032457 A1 | 1/2014 | Palmer et al. |

OTHER PUBLICATIONS

Rahman, Complete Design Methodology of a Massively Parallel and Pipelined Memristive Stateful IMPLY Logic Based Reconfigurable Architecture, Portland State University, Doctoral Thesis, Dissertations and Theses, Paper 2956, Spring Jun. 6, 2016, pp. 1-263 (Year: 2016).*

(Continued)

*Primary Examiner* — Wilbert L Starks
(74) *Attorney, Agent, or Firm* — Alleman Hall Creasman & Tuttle LLP

(57) ABSTRACT

Each processor of the SIMD array performs the computations for a respective neuron of a neural network. As part of this computation, each processor of the SIMD array multiplies an input to a weight and accumulates the result for its assigned neuron each (MAC) instruction cycle. A table in a first memory is used to store which input is fed to each processor of the SIMD array. A crossbar is used to route a specific input to each processor each MAC cycle. A second memory is used to provide the appropriate weight to each processor that corresponds the input being routed to that processor.

19 Claims, 7 Drawing Sheets

(56) References Cited

OTHER PUBLICATIONS

Franzon, et al., Hardware Acceleration of Sparse Cognitive Algorithms, Air Force Research Laboratory, Sensors Directorate, Wright-Patterson Air Force Base, Final Report, AFRL-RY-WP-TR-2016-0078, May 2016, pp. 1-46 (Year: 2016).*

Danese, et al., A Parallel Neural Processor for Real-Time Applications, IEEE Micro, vol. 22, Issue: 3, 2002, pp. 20-31 (Year: 2002).*

Albericio, et al., "Cnvlutin: Ineffectual-Neuron-Free Deep Neural Network Computing", In Proceedings of the ACM/IEEE 43rd International Symposium on Computer Architecture, Jun. 18, 2016, 13 Pages.

Chen, et al., "Eyeriss: A Spatial Architecture for Energy-Efficient Dataflow for Convolutional Neural Networks", In ACM/IEEE 43rd Annual International Symposium on Computer Architecture, Jun. 18, 2016, 13 Pages.

Han, et al., "EIE: Efficient Inference Engine on Compressed Deep Neural Network", In ACM/IEEE 43rd Annual International Symposium on Computer Architecture, Jun. 18, 2016, 12 Pages.

Kim, et al., "A Novel Zero Weight/Activation-Aware Hardware Architecture of Convolutional Neural Network", In IEEE on Design, Automation & Test in Europe Conference & Exhibition, May 27, 2017, 6 Pages.

Knag, et al., "A 1.40mm2 141mW 898GOPS Sparse Neuromorphic Processor in 40nm CMOS", In IEEE Symposium on VLSI Circuits, Jun. 15, 2016, 2 Pages.

Park, et al., "Zero and Data Reuse-Aware Fast Convolution for Deep Neural Networks on GPU", In International Conference on Hardware/Software Codesign and System Synthesis, Oct. 2, 2016, 10 Pages.

Pazienti, Francesco, "A Systolic Array for Neural Network Implementation", In Proceedings of 6th Mediterranean Electrotechnical Conference, May 22, 1991, pp. 981-984.

"International Search Report & Written Opinion Issued in PCT Application No. PCT/US2017/066912", dated Mar. 26, 2018, 18 Pages.

Sen, et al., "SPARCE: Sparsity Aware General Purpose Core Extensions to Accelerate Deep Neural Networks", Retrieved From https://arxiv.org/pdf/1711.06315.pdf, Nov. 29, 2017, 13 Pages.

Zhang, et al., "Cambricon-X: An Accelerator for Sparse Neural Networks", In 49th Annual IEEE/ACM International Symposium on Microarchitecture, Oct. 15, 2016, 12 Pages.

Pietras, Marcin, "Hardware conversion of neural networks simulation models for Neural Processing Accelerator implemented as FPGA-based SoC", In Proceedings of 24th International Conference on Field Programmable Logic and Applications, Sep. 2, 2014, 4 pages.

"Fujitsu doubles deep learning neural network scale with technology to improve GPU memory efficiency", http://phys.org/news/2016-09-fujitsu-deep-neural-network-scale.html, Published on: Sep. 21, 2016, 4 pages.

Benjamin, et al., "Neurogrid: A Mixed-Analog-Digital Multichip System for Large-Scale Neural Simulations", In Proceedings of the IEEE, vol. 102, No. 5, May 2014, pp. 699-716.

Kumar, Samir, "Introducing Qualcomm Zeroth Processors: Brain-Inspired Computing", https://www.qualcomm.com/news/onq/2013/10/10/introducing-qualcomm-zeroth-processors-brain-inspired-computing?tag=Zeroth, Published on: Oct. 11, 2013, 5 pages.

Scott, Cameron, "NeuroGrid—A Circuit Board Modeled after the Human Brain", https://singularityhub.com/2014/05/16/neurogrid-a-circuit-board-modeled-on-the-human-brain/, Published on: May 16, 2014, 3 pages.

Yazdanbakhsh, et al., "Neural Acceleration for GPU Throughput Processors", In Proceedings of the 48th International Symposium on Microarchitecture, Dec. 5, 2015, pp. 1-13.

Indiveri, et al., "Memory and information processing in neuromorphic systems", In Proceedings of the IEEE, Jun. 2015, pp. 1-17.

Modha, Dharmendra S., "Introducing a Brain-inspired Computer", http://www.research.ibm.com/articles/brain-chip.shtml, Retrieved on: Dec. 27, 2016, 5 pages.

Khan, et al., "SpiNNaker: Mapping Neural Networks onto a Massively-Parallel Chip Multiprocessor", In Proceedings of IEEE International Joint Conference on Neural Networks, Jun. 1, 2008, pp. 2850-2857.

Danese, et al., "A Parallel Neuralprocessor Forreal-Time Applications", In Journal of IEEE Micro, vol. 22, Issue 3, May 2002, pp. 20-31.

Huang, Jen-Hsun, "Accelerating AI with GPUs: A New Computing Model", https://blogs.nvidia.com/blog/2016/01/12/accelerating-ai-artificial-intelligence-gpus/, Published on: Jan. 12, 2016, 11 pages.

* cited by examiner

NEURAL NETWORK PROCESSOR

RELATED APPLICATIONS

This application claims the benefit of U.S. Application Ser. No. 62/440,655, filed Dec. 30, 2016, the contents of which are incorporated herein by reference in its entirety for all purposes.

BACKGROUND

Artificial neural networks are a broad class of algorithms and/or circuitry that use a 'network' consisting of multiple layers of inter-connected nodes for machine learning and pattern recognition. The structure of artificial neural networks were inspired by animal nervous systems. In these systems/networks, nodes may be referred to as neurons and edges are may be referred to as synapses. Each edge has an associated weight, and the structure of the network defines rules that pass data from layer to layer. The function accomplished by a neural network is characterized be relationship between the input (i.e., first) and output (i.e., last) layers. This function is parameterized by the weights associated with the edges. Various tasks such as character recognition, speech recognition, spam detection, and computer vision can be performed by a neural network by selecting (or learning) an appropriate set of weights.

SUMMARY

Examples discussed herein relate to an integrated circuit including an N-way single-instruction multiple data (SIMD) array of processors. Each processor of the array includes a multiply-accumulate unit having a respective accumulator. A crossbar is included to provide a respective selected neural network input value to each of the N processors. The N number of selected neural network input values are selected from M number of input values.

In another example, a method of computing, in parallel, a plurality of neuron outputs of a neural network, includes receiving a plurality of neural network input values. The method also includes providing, from a first memory and based on a first index, a first plurality of neural network weights to a corresponding plurality of multiply-accumulate units. The method also includes receiving, from a second memory and based on a second index, a plurality of crossbar control values that associate each of the plurality of neural network input values to the respective ones of the plurality of multiply-accumulate units. The method also includes, based on the plurality of crossbar control values, providing the plurality of neural network input values to the to the respective ones of the plurality of multiply-accumulate units. The method also includes performing, in parallel and by the plurality of multiply-accumulate units, respective multiply-accumulate operations using the respective first plurality of neural network weights and the respective plurality of neural network input values.

In another example, an integrated circuit includes a plurality of multiply-accumulate units, a first memory, a second memory, and a crossbar. The plurality of multiply-accumulate units receive respective first operands and respective second operands. The first memory to provides, based on a first index, a corresponding plurality of respective second operands to the plurality of multiply-accumulate units. The crossbar to provides a corresponding plurality of respective first operands to the plurality of multiply-accumulate units. The second memory controls, based on a second index, the crossbar to provide, from a plurality of sources, the corresponding plurality of respective first operands to the plurality of multiply-accumulate units.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

In order to describe the manner in which the above-recited and other advantages and features can be obtained, a more particular description is set forth and will be rendered by reference to specific examples thereof which are illustrated in the appended drawings. Understanding that these drawings depict only typical examples and are not therefore to be considered to be limiting of its scope, implementations will be described and explained with additional specificity and detail through the use of the accompanying drawings.

DETAILED DESCRIPTION OF THE EMBODIMENTS

Figure 1A:
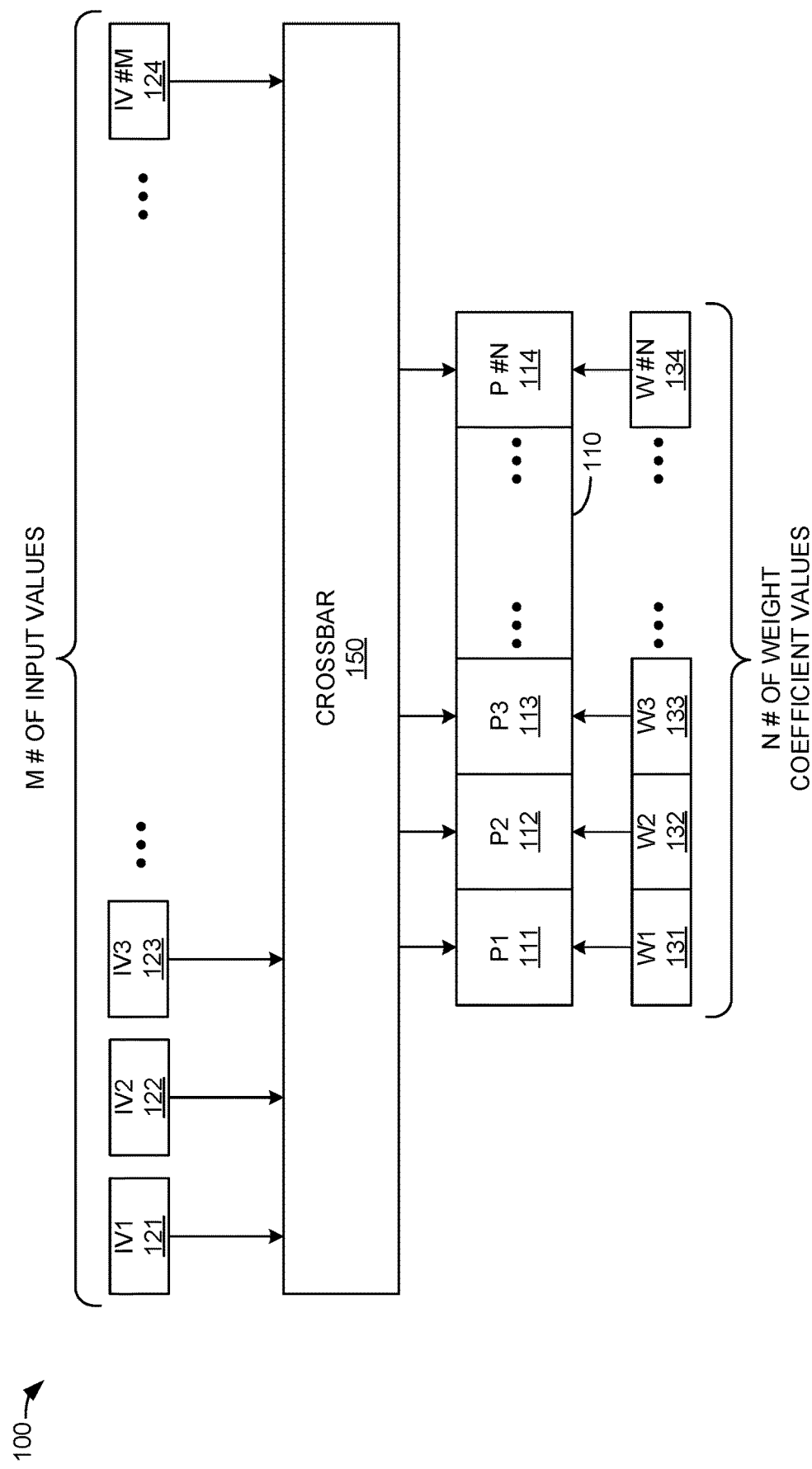
FIGS. 1A and 1B are a block diagrams illustrating an input configuration to a single-instruction multiple-data (SIMD) array.

Examples are discussed in detail below. While specific implementations are discussed, it should be understood that this is done for illustration purposes only. A person skilled in the relevant art will recognize that other components and configurations may be used without parting from the spirit and scope of the subject matter of this disclosure. The implementations may be a machine-implemented method, a computing device, or an integrated circuit.

A layer of a neural network may have P neurons and Q inputs to each neuron. Each input to each neuron is assigned a weight (herein, W(q,p) is the weight used for input #q to neuron #p.) To obtain the output of a neuron, the weight for each input is multiplied by the value present at the corresponding input and the results added together (i.e., accumulated.) The accumulated result is typically input to a non-linear function (a.k.a., activation function) to produce a final output of the neuron. Thus, it may take as many as P*Q multiply-add (a.k.a. multiply-accumulate—MAC) operations to implement a layer of the neural network.

In an embodiment, each processor of the SIMD array performs the computations for a respective neuron. As part of this computation, each processor of the SIMD array multiplies an input to a weight and accumulates the result for its assigned neuron each (MAC) instruction cycle. However, the array of weights may be sparsely populated with non-zero values. In other words, for a given neuron (e.g., neuron #p) the array of weights for that neuron (e.g., W(1 to Q, p) may only have a few non-zero entries. A table in a first memory is used to store which input is fed to each processor of the SIMD array. A crossbar is used to route a specific input to each processor each MAC cycle. A second memory is used to provide the appropriate weight to each processor that corresponds the input being routed to that processor.

In this manner, during any particular MAC cycle, inputs to a particular neuron that are associated with a zero-valued weight may be skipped and instead an input having a non-zero valued weight can be presented to the processor. Once all the inputs with non-zero valued weights for a given neuron have been processed, the processor may be idled or otherwise not used. This helps decrease power consumption while other neurons are being processed. Skipping inputs associated with zero valued weights can also increase processing speed by performing only the minimum number of MAC cycles necessary (i.e., those with non-zero weights) to be computed while processing a given neuron. In this case, the number of MAC cycles necessary to process all of the neurons assigned to the SIMD array corresponds to the maximum number of non-zero valued weights associated with any given single neuron being processed by the SIMD array—which, for a sparsely populated array of weights may be much less than the maximum number of non-zero weights, Q.

To illustrate, consider an example where the number of inputs to each neuron is Q=128, and the maximum number of non-zero weights for any given neuron is 16. In this case, at most 16 MAC instruction cycles would be required to compute output of all the neurons being processed by the SIMD array. Thus, instead of consuming Q=128 MAC cycles by the SIMD array to process each input to each neuron (because zero valued weights are processed), only 16 MAC cycles need to be performed—an 8× improvement in processing speed. In addition, because a SIMD array is used to perform the MAC cycles, the width of the SIMD array allows multiple neurons to be processed in parallel.

Figure 1B:
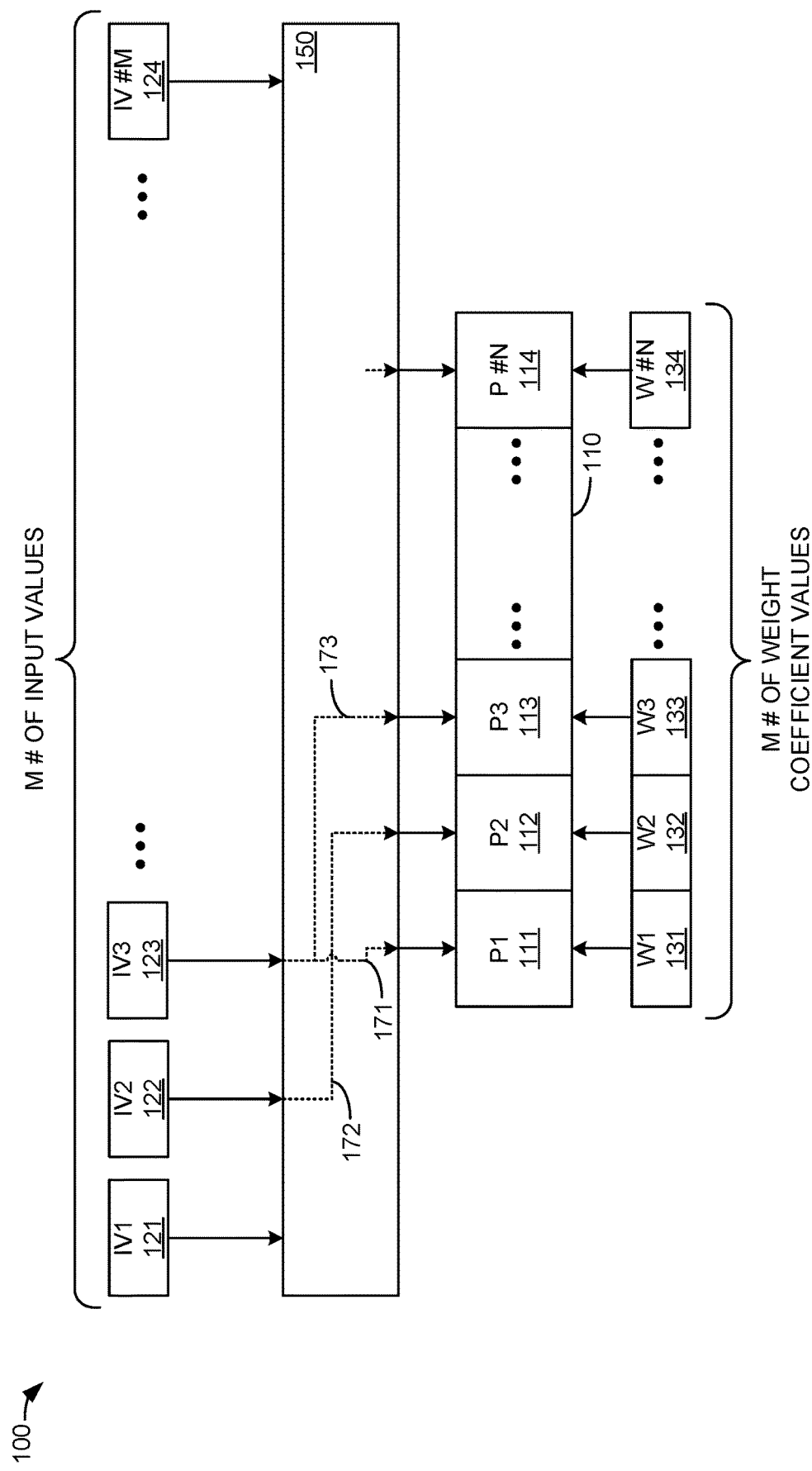

FIGS. 1A and 1B are a block diagrams illustrating an input configuration to a single-instruction multiple-data (SIMD) array. In FIG. 1, system 100 is illustrated as including SIMD array 110, crossbar 150, M number of input values 121-124, and N number of weight coefficient values 131-134. System 100 may be part of, or implemented by, an integrated circuit. SIMD array includes N number of processors 111-114. Input values 121-124 are operatively coupled to the input of crossbar 150. The outputs of crossbar 150 are respectively coupled to processors 111-114 such that each processor 111-114 is provided at least one input value 111-114. Crossbar 150 may provide an input value 111-114 to more than one processor 111-114. Weight coefficients 131-134 are respectively coupled to processors 111-114 such that each processor 111-114 is provided with at least one weight coefficient 131-134.

In operation, crossbar 150 is configured for multiply-accumulate operations being performed by SIMD array 110 such that a respective processor 111-114 receives the respective input value 121-124 that corresponds to the respective weight coefficient 131-134 and neuron being processed by that respective processor 111-114 for each MAC operation performed. In an embodiment, the weights 131-134 and input values 121-124 may be selected such that none of the weights 131-134 are zero for a particular MAC operation being performed by SIMD array 110.

Consider an example where there are only 3 neurons being processed and the neuron (i.e., neuron #1) associated with processor P1 111 is to use the following weights for input values: IV1 111 W(1,1)=0, IV2 112 W(2,1)=0, and W(3,1)=25; the neuron (i.e., neuron #2) associated with processor P2 112 is to use the following weights: IV1 111 W(1,2)=0, IV2 112 W(2,2)=75, and W(3,2)=19; and, the neuron (i.e., neuron #3) associated with processor P3 113 is to use the following weights: IV1 111 W(1,3)=0, IV2 112 W(2,3)=0, and W(3,3)=200. Because the weights W(1,1) and W(2,1) for neuron #1 are both zero, and W(1,3) is nonzero, crossbar 150 can be configured to provide IV3 123 to processor P1 111 (illustrated in FIG. 1B by arrow 171). Because weight W(1,2) is zero and W(2,2) for neuron #2 is nonzero, crossbar 150 can be configured to provide IV2 123 to processor P2 112 (illustrated in FIG. 1B by arrow 172). Because the weights W(1,3) and W(2,3) for neuron #3 are both zero, and W(1,3) is nonzero, crossbar 150 can be configured to provide IV3 123 to processor P1 111 (illustrated in FIG. 1B by arrow 173). Likewise, system 100 would be configured to, on the same MAC cycle, provide the non-zero weights W1=W(3,1) to processor P1 111, weight W2=W(2,2) to processor P2 112, and weight W3=W(3,3) to processor P3 113.

It should be understood that configuring crossbar 150 and weights 131-134 accordingly allows processors 111-114 to substantially reduce or eliminate calculating MAC operations for input-weight pairs to a given neuron that would always result in the accumulation of a zero result (because the corresponding weight W( ) equals zero.) This reduction or elimination of zero accumulating MAC operations can reduce the power consumed and the number of MAC cycles necessary to fully calculate/accumulate the neurons in a layer of a neural network.

Figure 2:
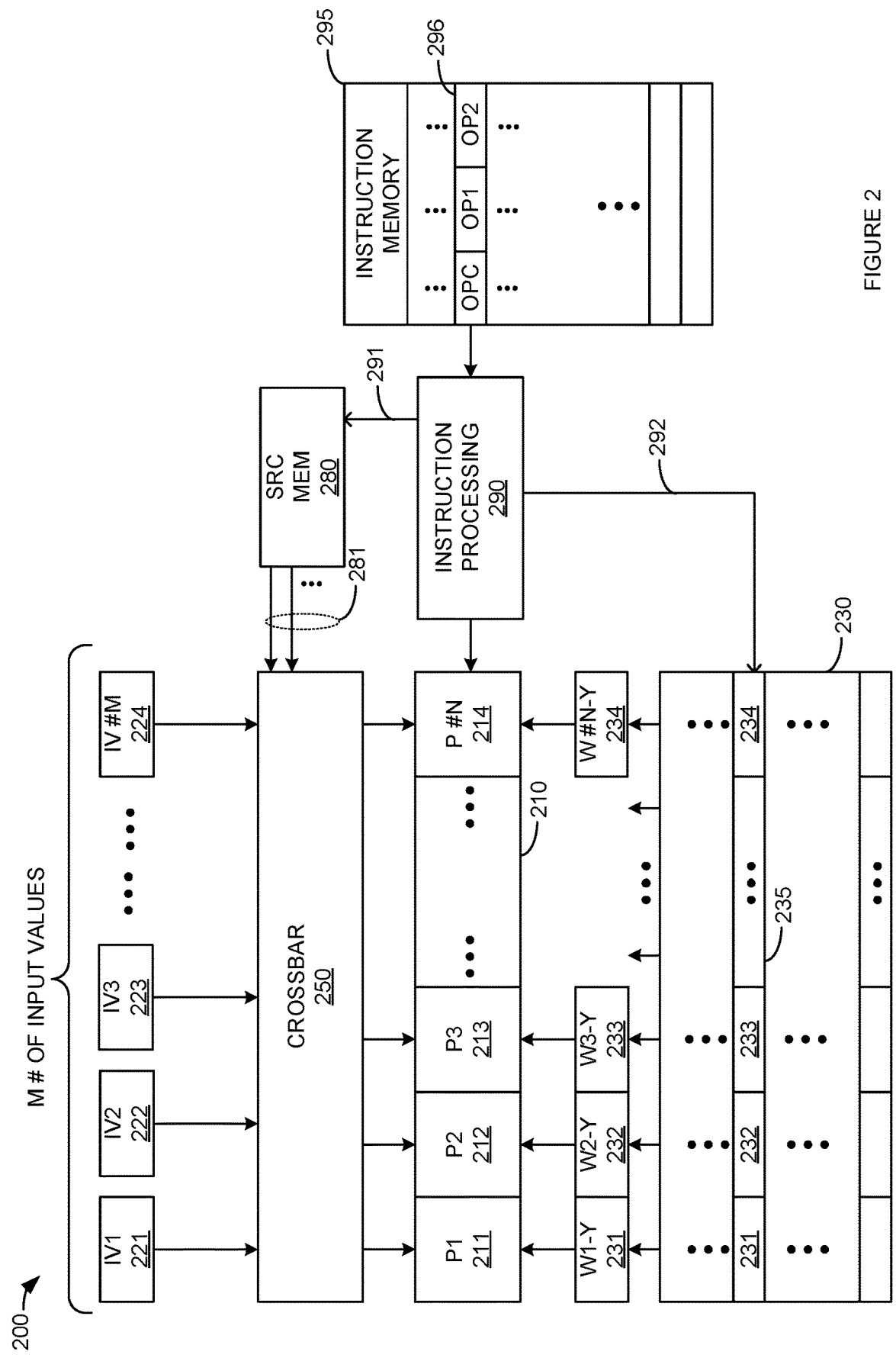
FIG. 2 is a block diagram illustrating a processor.

FIG. 2 is a block diagram illustrating a processor. In FIG. 2, system 200 includes SIMD processing array 210, M number of input values 221-224, N number of weights 231-234, weight memory 230, source memory 280, instruction processing 290, and instruction memory 295. System 200 may be part of, or implemented by, an integrated circuit. SIMD array 210 includes N number of processors 211-214. Input values 221-224 are operatively coupled to the input of crossbar 250. The outputs of crossbar 250 are respectively coupled to processors 211-214 such that each processor 211-214 can be provided at least one input value 211-214. Crossbar 250 may provide an input value 211-214 to more than one processor 211-214. Weight coefficients 231-234 are respectively coupled to processors 211-214 such that each processor 211-214 an be provided with at least one weight coefficient 231-234.

Weight memory 230 stores a table of weight values that can be provided to processors 211-214 based on an index (address) 292 received from instruction processing 290. Source memory 280 stores a table of control values 281 that can be provided to crossbar 250 based on an index (address) 291 received from instruction processing 290. The control values 281 configure crossbar 250 to select respective input values 221-224 to be provided to processors 211-214.

Instruction memory 295 stores instructions 296 that are decoded by instruction processing 290. Instruction processing 290 decodes instructions 296 to produce signals (not shown in FIG. 2) that can operate to control system 200 to operate as described herein. Instructions 296 may include opcode (OPC), operand #1 (OP1), and operand #2 (OP2). In an embodiment, for an opcode that corresponds to a MAC operation, OP1 and OP2 may indicate or otherwise determine (e.g., by indirect addressing) the indexes 291, 292 used to address source memory 280 and weight memory 230, respectively. Thus, instructions 296 may be used to specify index 291 which selects a corresponding entry in source memory 280 that is output to control crossbar 250 as described herein. Likewise, instructions 296 may be used to specify index 291 which selects a corresponding entry in source memory 280 that is output to control crossbar 250 as described herein. In an embodiment, instructions 296 may be used to load the contents of source memory 280 and weight memory 230.

In an embodiment, system 200 is part of an integrated circuit. Each processor 210-214 of SIMD array 210 includes a multiply-accumulate unit that has a respective accumulator and can perform MAC operations on input values provided from crossbar 250 (based on control values stored in source memory 280) and weight coefficient values provided from weight memory 230. Crossbar 280 provides respective selected neural network input value 221-224 to each of the N processors 210-214 of SIMD array 210. The N number of selected neural network input values selected from M number of input values 221-224. In an embodiment, M>N.

Instruction memory 295 can provide a first index (e.g., OP1) to address source memory 280. The output of source memory determines the respective input value 221-224 provided to each of the N processors 221-224. Instruction memory 295 also provides a second index (e.g., OP2) to address a weight memory 230. Output fields (e.g., individual weight values 231-234) of weight memory 230 are respectively provided to each of the N processors 221-224. The input values 221-224 provided by crossbar 250 and the weight values 231-234 can be respectively multiplied and accumulated by processors 211-214 according to instructions 296.

In an embodiment, SIMD array 210 has N processors. SIMD array 210 may also be configured to operate a smaller number of processors (e.g., X number of processors where N>X.) By operating a smaller number of processors 211-214, system 200 can reduce power consumption.

In an embodiment, values accumulated or produced (e.g., output of an activation function) by processors 211-214 may be provided to crossbar 250 as input values 221-224. Using accumulated values as input values 221-224 may allow fewer processors 211-214 to be operated during certain MAC operations. For example, if a particular neuron (or group of neurons—e.g., N/2 neurons) being accumulated has processed all of its inputs with non-zero weights, then the accumulated values in the remaining processors may be fed-back to SIMD array 210 after SIMD array 210 is configured to operate with only X=N/2 processors.

In an embodiment, the outputs of processors 221-224 are the output of the neuron a respective processor 211-214 calculated (e.g., output of an activation function). Using these outputs as inputs values 221-224 allows a next layer of the neural network to be processed by system 200.

In an embodiment, input values 221-224 are the input values to a neural network being implemented by the instructions 296 in memory 295. The weights of this neural network may be provided to processors 211-214 from weight memory 230 based on an index 292 received from instruction processing 290. Crossbar 250 may receive control values (signals) that associate input values 221-224 to processors 211-214 from source memory 280. When crossbar 250 is configured by the control values from source memory 280, input values 221-224 may be provided, by crossbar 250, to processors 211-214 in accordance with the respective associations between input values 221-224 and processors 211-214. Instruction processing 290 may control SIMD array 210 to perform, in parallel, MAC operation that use the weights 231-234 and input values 221-224 provided to respective processors 211-214.

In an embodiment, index 291 may be received by instruction processing 290 from instruction memory 295 (e.g., as operand OP1). Index 292 may be received by instruction processing 290 from instruction memory 295 (e.g., as operand OP2). Index 291 and Index 292 may be associated with a MAC operation code in memory 295 (e.g., as part of a MAC instruction.) Other instruction(s) may control instruction processing 290 to perform other actions. For example, instruction processing 290 may control processors 211-214 to calculate an activation function based on the value in respective accumulators of processors 211-214. The output of the activation function may be output by processors 211-214 (e.g., for provision to processors 211-214 in order to implement a subsequent neural network layer.)

Figure 3:
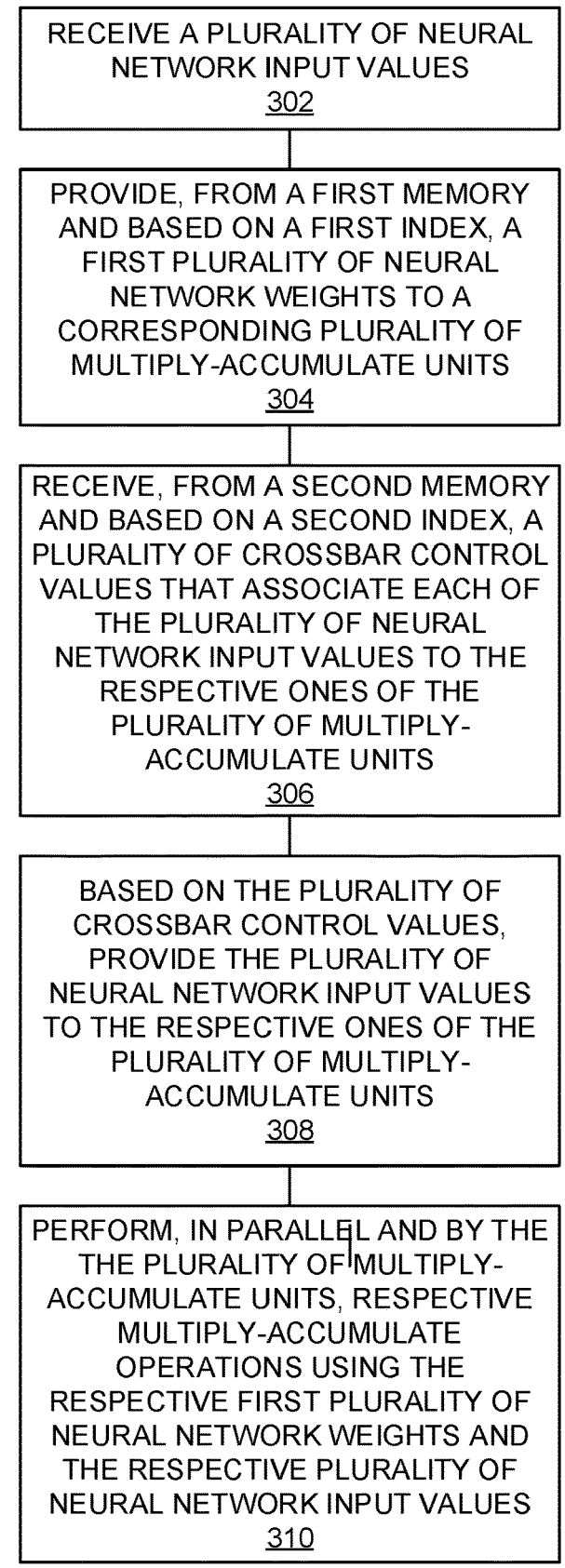
FIG. 3 is a flowchart of a method of evaluating multiple neural network neurons in parallel.

FIG. 3 is a flowchart of a method of evaluating multiple neural network neurons in parallel. The steps illustrated in FIG. 3 may be performed, for example, by one or more elements of system 100, system 200, and/or their components. A plurality of neural network input values are received (302). For example, input values 221-224 may be received by crossbar 250 (e.g., from feature extraction circuitry and/or feature extraction processor.) From a first memory, and based on a first index, a first plurality of neural network weights are provided to a corresponding plurality of multiply-accumulate units (304). For example, based on index 292 from instruction processing 290, weight memory 230 may provide weight values 231-234 to respective processors 211-214.

From a second memory, and based on a second index, a plurality of crossbar control values that associate each of the plurality of neural network input values to the respective ones of the plurality of multiply-accumulate units are received. For example, based on index 291 from instruction processing 290, source memory 230 may provide crossbar control values 281 to crossbar 250 in order to configure crossbar 250.

Based on the plurality of crossbar control values, the plurality of neural network input values are provided to the respective ones of the plurality of multiply-accumulate units (308). For example, based on the control values 281 configuring crossbar 250, crossbar 250 may provide respective input values 221-224 to processors 211-214 in accordance with the respective associations between input values 221-224 and processors 211-214.

In parallel and by the plurality of multiply-accumulate units, respective multiply-accumulate operations are performed using the respective first plurality of neural network weights and the respective neural network input values (310). For example, SIMD array 210 may perform, using processors 211-214 in parallel, N number of multiply-accumulate operations that use the input values 221-224 and weight values 231-234 provided to the respective processors 211-214.

Figure 4:
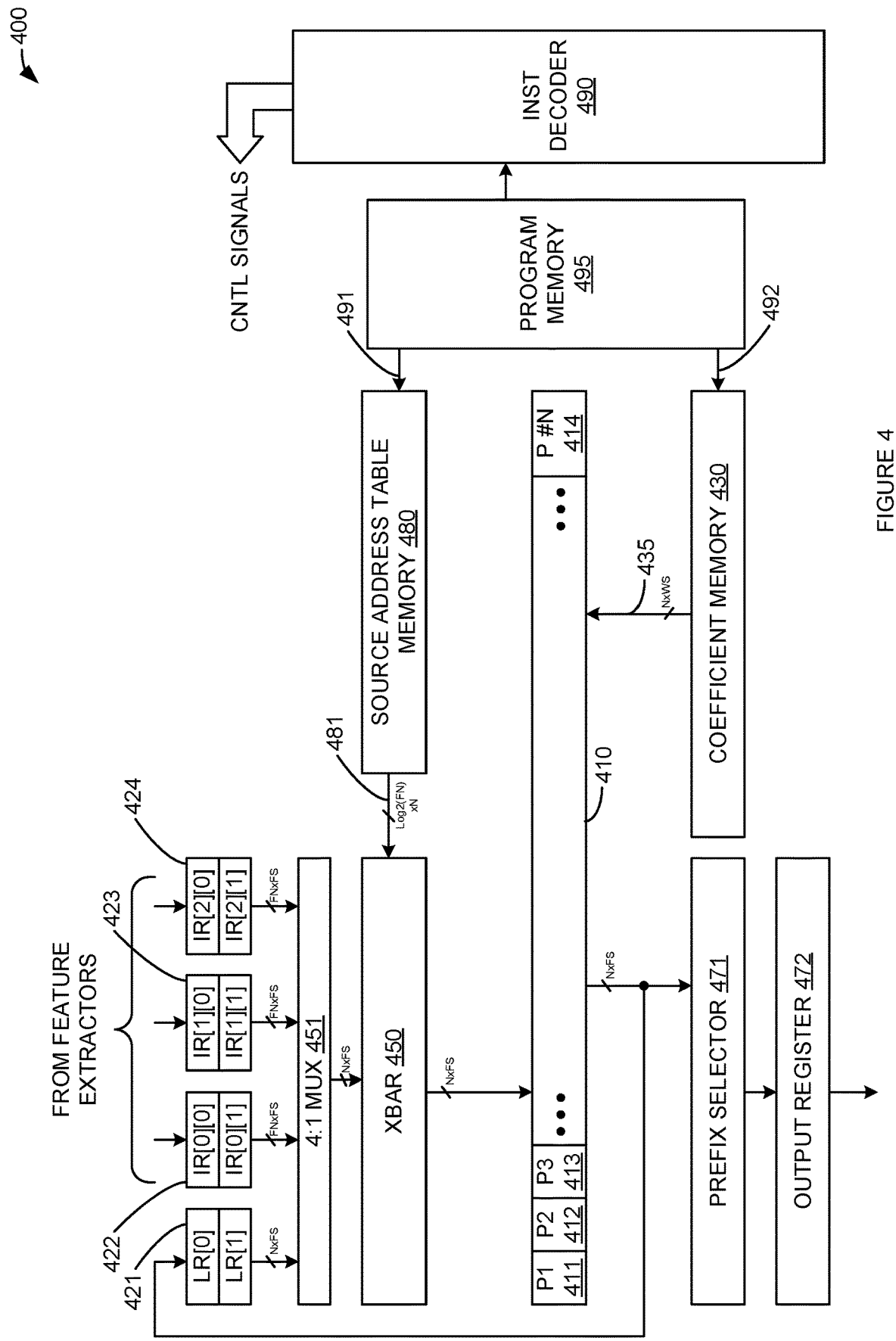
FIG. 4 is a block diagram illustrating a neural network processor.

FIG. 4 is a block diagram illustrating a neural network processor. In FIG. 4, system 400 includes SIMD array 410, MUX 451, local register 421, input registers 422-424, coefficient (weight) memory 430, source address table memory 480, program memory 495, and instruction decoder 490. System 400 may be part of, or implemented by, an integrated circuit. SIMD array 410 includes N number of processors 411-414. Input registers 422-424 each provide FN multiplied by FS number of bits to MUX 451, where FN is the number of features input to each of input registers 422-424, and FS is the number of bits representing each feature. In an embodiment, FS is eight (8) bits and FN is 128 (FN×FS=1024.) Local register 421 provides N multiplied by FS number of bits to MUX 451. In an embodiment, N=128 (N×FS=1024.) MUX 451 provides one of the outputs of local register 421 and input registers 422-424 to crossbar 450 to be used as input values (e.g., input values 221-224.)

Coefficient memory 430 stores weight values 435 that can be provided to processors 411-414 based on an index (address) 492 received from program memory 495. Source address table memory 480 stores control values 481 that can be provided to crossbar 450 based on an index (address) 491 received from program memory 495. Control values 481 configure crossbar 450 to select respective input values from MUX 451 to be provided to processors 411-414. Outputs from processors 411-414 may be fed-back to local register 421. Instruction decoder 490. Outputs from SIMD array 410 can be provided to prefix selector 471. Prefix selector 471 is operatively coupled to output register 472.

Program memory 495 provides instructions (e.g., 295) to instruction decoder 490. Instruction decoder 490 decodes instructions to produce control signals that operate to control system 400 to operate as described herein. An example instruction set for system 400 is given in Table 1.

TABLE 1

| Instruction: Opcode, Operands | Opcode | Description |
|---|---|---|
| Nop | 0000 | No operation. Instruction may be needed to flush pipeline for layer changes |
| Halt | 0001 | This is the end of the program. System 400 can now start a new operation. This instruction may flush the instruction/data pipeline(s) to put system 400 in an initial state. Program counter is set to an initial value (e.g., PC = 0_; Accumulators in processors 411-414 are set to initial values (e.g., 0); Input register 421 is set to an initial value (e.g., 0); input registers are set to initial values (e.g., 0). |
| UnlockIReg | 0010 | Once system 400 starts executing a new operation, the registers 421-422 are locked. This instruction takes the place of the normal, NOP in a layer change. Once the unlock occurs the program should not read input registers 422-424 as their outputs change. An error condition may occur as a result of the program reading input registers 422-424 when their outputs can change. |
| ReLU_store<br>Src1[7:0] - shiftCount<br>Src2[7:0] - resv<br>Src3[0] - resv<br>Src4[0] -- destReg | 0011 | Arch Name: ReLU_and_store shiftCount<br>Perform ReLU Activation function<br>Input: 20-bit signed number (per neuron)<br>Output: 8-bit unsigned number (per neuron)<br>Pseudo code:<br>    for (neuron = 0; neuron < neuronCount; neuron++)<br>    {<br>    // shift count is limited to 8-0<br>        temp = acc[neuron][19:0] >> shiftCount[3:0];<br>        src[7:0] = Saturate8(temp[19:0]);<br>        if (src < 0)<br>            src = 0;<br>        lr[dstReg]= src[7:0];<br>    } |
| sigmoid_store<br>Src1[7:0] - shiftCount<br>Src2[7:0] - resv<br>Src3[0] - resv<br>Src4[0] -- destReg | 0100 | Arch Name: sigmoid_and_store shiftCount<br>Perform sigmoid activation function<br>Input: 20-bit signed number (per neuron)<br>Output: 8-bit unsigned number (per neuron)<br>Pseudo code:<br>    for (neuron = 0; neuron < neuronCount; neuron++)<br>    {<br>    // shiftCount is limited to 8-0<br>        temp = acc[neuron][19:0] >> shiftCount[3:0];<br>        src[11:0] = Saturate12(temp[19:0]);<br>    // Sigmoid fixed<br>        absval = abs(input);<br>        Sign = input[19];<br>        Value[7:0] = (absval < 32)? Absval[7:0] :<br>            (absval < 64)? Absval[8:1] + 0x10 :<br>            (absval < 128)? Absval[9:2] + 0x20 :<br>            (absval < 256)? Absval[10:3] + 0x30 :<br>            (absval < 512)? Absval[11:4] + 0x40 :<br>            (absval < 1024)? { 0 , Absval[11:5]} + 0x50 :<br>            {00, Absval[11:6]} + 0x60 :<br>        lr[dsrReg] = sign? -value[7:0] : value[7:0] |
| SetNeuronCount = n;<br>Src1[7:0] - n<br>Src2[7:0] - resv<br>Src3[0] - resv<br>Src4[0] - resv | 0101 | Sets neuron count.<br>Defaults to 128 (if not set)<br>Max = 128<br>Min = 16 |

TABLE 1-continued

| Instruction: Opcode, Operands | Opcode | Description |
|---|---|---|
| ReLU_prefix<br>Src1[7:0] - shiftCount<br>Src2[7:0] - threshold<br>Src3[0] - resv<br>Src4[0] - resv | 0110 | Arch Name: ReLU_and_GetPrefixType<br>This is an instruction to determine prefix type.<br>Pseudo code:<br>    Final = (neuronCount > 64)? 64 : neuronCount;<br>    // others could be power gated<br>    for (neuron = 0; neuron < Final; neuron++)<br>    {<br>    // shift count is limited to 8-0<br>        temp = acc[neuron][19:0] >> shiftCount[3:0];<br>        src[7:0] = Saturate8(temp[19:0]);<br>        acc[neuron][19:0] = (src[7:0] < 0)? 0 :<br>            {12'b0 ,<br>    acc[neuron][7:0] }<br>    } // neuron's are updated to 8 bit value, simply the sort<br>    // Sort64 will pick the largest neuron out of the 64.<br>    Prefix_selected = SORT64(acc[63:0][7:0]);<br>    Prefix = (Prefix_selected < threshold)?<br>    0 :<br>    Prefix_selected; |
| sigmoid_prefix<br>Src1[7:0] - shiftCount<br>Src2[7:0] - threshold<br>Src3[0] - resv<br>Src4[0] -- resv | 0111 | Arch Name: sigmoid_and_GetPrefixType<br>Activation function<br>Input: 20-bit signed number (per neuron)<br>Output: 8-bit unsigned number (per neuron)<br>Pseudo code:<br>    Final = (neuronCount > 64)? 64 : neuronCount;<br>    // others could be power gated<br>    for (neuron = 0; neuron < Final; neuron++)<br>    {<br>    // shiftCount is limited to 8-0<br>        temp = acc[neuron][19:0] >> shiftCount[3:0];<br>        src[11:0] = Saturate12(temp[19:0]);<br>    // Sigmoid fixed<br>    absval = abs(input);<br>    Sign = input[19];<br>    Value[7:0] = (absval < 32)? Absval[7:0] :<br>        (absval < 64)? Absval[8:1] + 0x10 :<br>        (absval < 128)? Absval[9:2] + 0x20 :<br>        (absval < 256)? Absval[10:3] + 0x30 :<br>        (absval < 512)? Absval[11:4] + 0x40 :<br>        (absval < 1024)? { 0 , Absval[11:5]} + 0x50 :<br>        {00 , Absval[11:6]} + 0x60 :<br>    acc[*][7:0] = sign? -value[7:0] : value[7:0]<br>    // Sort64 will pick the largest neuron.<br>    Prefix_selected = SORT64(acc[63:0][7:0]);<br>    Prefix = (Prefix_selected < threshold)?<br>    0:<br>        Prefix_selected; |
| Load_accumulator<br><br>Src1[7:0] = cptr<br>Src2[7:0] = Reserv<br>Src3[0] = Reserv<br>Src4[0] = Reserv | 1000 | Instruction to load the accumulator with bias values from coefficient memory for each neuron.<br>Pseudo code:<br>    for (neuron = 0; neuron < neuronCount; neuron++)<br>        acc[neuron] = coeffMem[cptr][neuron]; |
| Mac dptr, srcReg<br>Src1[7:0] = cptr<br>Src2[7:0] = aptr<br>Src3[0] = I vs L reg.<br>Src4[0] = high/low<br>NOTE: the engine is implicit. See opcode | 1001 | Perform one mac operation for each neurons - saturate if results exceeds 20- bits<br>Pseudo code:<br>    dataReg = Src3? LR[src4] : IR[engine][src4];<br>    for (neuron = 0; neuron < neuronCount; neuron++)<br>    {<br>        src1 = coeffMem[cptr][neuron];<br>        inputNeuron = SrcAddrTable[aptr][neuron];<br>        src2 = dataReg[inputNeuron];<br>        acc[neuron] = acc[neuron] + src1 * src2;<br>        Saturate20(acc[neuron]); // 20-bit saturation<br>    } |

An example of an instruction sequence to operate system 400 is given in Table 2. The instruction sequence given in Table 2 may be stored in program memory 495. The example sequence in Table 2 uses a feature size (FS) of 8 bits, and a number of processors (N) of 128.

| Program Memory 495 address | Opcode | Coeff Memory 440 address | Source Address Table 480 Input | Source Register 421-424 | Comments |
|---|---|---|---|---|---|
| | | Specify neuron count | | | |
| 0 | SetNeuronCount | 128 | | | Neuron Count = 128 (this sets SIMD width) - can be used for clock level gating of processors 411-414 for lower power |
| | | Load bias data | | | |
| 1 | Load Acc | coeff[0] | | | Load Bias to accumulators from coeff memory 430 index 0. |
| | | 2 macs for each neuron from first 1024-bit data | | | |
| 2 | mac | coeff[1] | atable[0] | IR[0] | Perform MAC operation. Weights to be read from coeff memory 430 index 1. Data comes from first word of feature extractor register data. The input data is shuffled by crossbar 450 using mapping in source address table 480. Note: actual data register accessed depends on which feature vector output is being processed. |
| 3 | mac | coeff[2] | atable[1] | IR[0] | |
| | | 2 macs for each neuron from second 1024-bit data | | | |
| 4 | mac | coeff[3] | atable[2] | IR[1] | Perform next set of MAC operations. Same as before, but a second input register 422-423 is used. |
| 5 | mac | coeff[4] | atable[3] | IR[1] | |
| | | Note: the MAC computation for a first layer is now done | | | |
| 6 | relu_and_st | 3 | | LR[0] | Perform ReLU operation and store Mac output is shifted right by 3-bits prior to ReLu operation. |
| 7 | unlock_ireg | | | | This instruction frees the input register so that the next set of data from feature vector can be loaded into input register while processing is still going on. |

-continued

| Program Memory 495 address | Opcode | Coeff Memory 440 address | Source Address Table 480 Input | Source Register 421-424 | Comments |
|---|---|---|---|---|---|
| 8 | nop | | | | Data stored in register is not available for use. Need three nops between relu_and_st instruction and next and mac instruction. |
| | | Second Layer - Input is from local register. Load bias data | | | |
| 9 | Load Acc | coeff[5] | | | Load Bias to accumulators from coeff memory 430 index 5. |
| 10 | mac | coeff[6] | atable[4] | LR[0] | Perform MAC operation. Weights to be read from coeff memory 430 index 6. Data comes from local register 421. The input data is shuffled by crossbar 450 using mapping in source address table at index 4. |
| 11 | mac | coeff[7] | atable[5] | LR[0] | |
| 12 | mac | coeff[8] | atable[6] | LR[0] | |
| 13 | relu_and_st | 3 | | LR[0] | Perform ReLU operation and store MAC output is shifted right by 3 bits prior to ReLU operation. |
| 14 | nop | | | | |
| | | Final Layer | | | |
| 15 | SetNeuronCount | 64 | | | Output layer has 64 neurons. |
| 16 | Load Acc | | coeff[9] | | Load bias |
| 17 | mac | atable[7] | coeff[10] | LR[0] | |
| 18 | mac | atable[8] | coeff[11] | LR[0] | |
| 19 | relu and GetPrefixNum | 3 | | LR[0] | Perform Relu and then get prefix number. This instruction executes in multi-cycles. Mac output is shifted right by 3 bits prior to ReLU operation. |
| 20 | Halt | | | | End of processing. If more data available, the processing can start at PC = 0. Otherwise, processor goes to IDLE state. |

Figure 5:
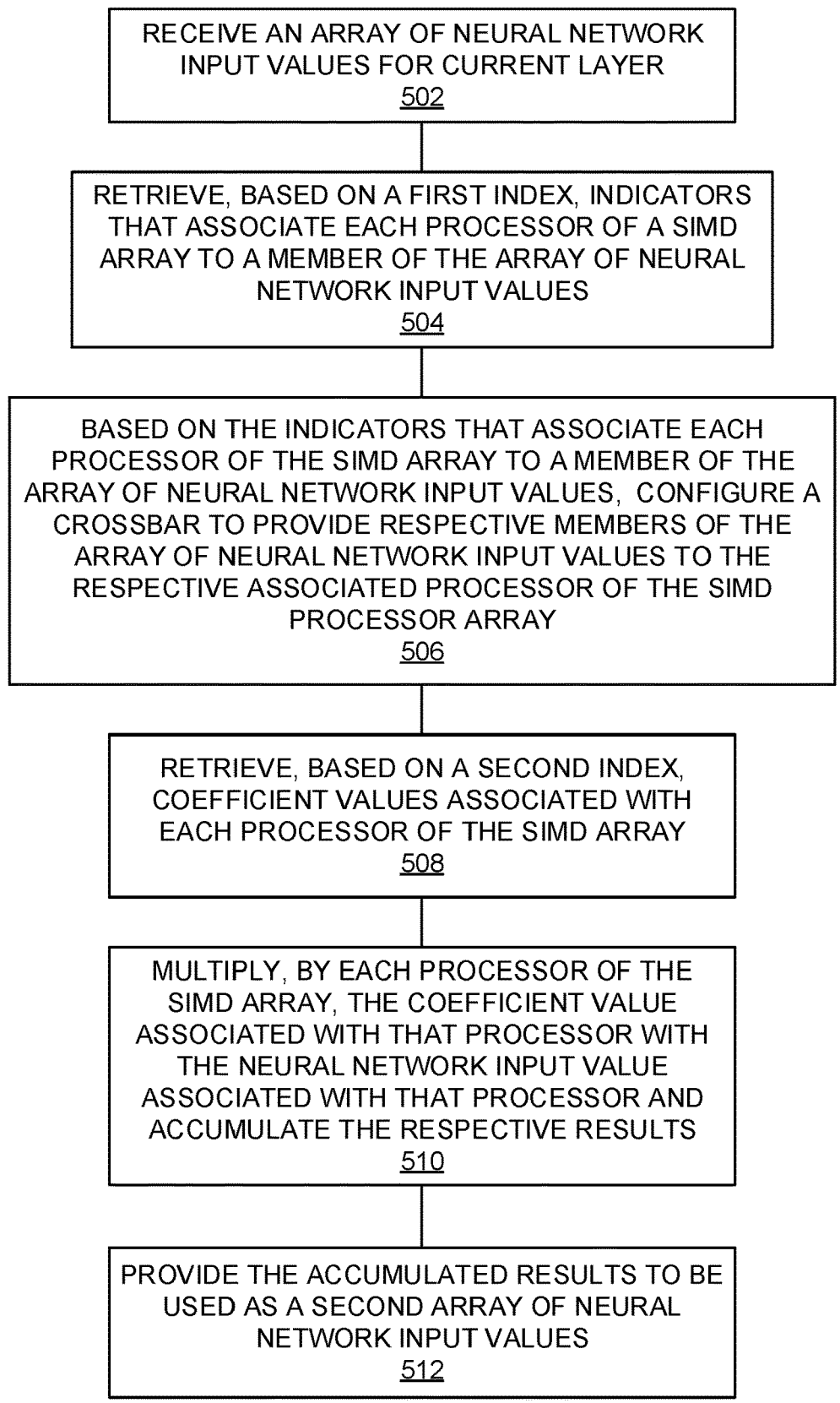
FIG. 5 is a flowchart illustrating a method of operating a neural network processor.

FIG. 5 is a flowchart illustrating a method of operating a neural network processor. The steps illustrated in FIG. 5 may be performed, for example, by one or more elements of system 100, system 200, system 400, and/or their components. An array of neural network input values for a current layer is received (502). For example, crossbar 450 may receive input values from local register 421 or an input register 422-424 via MUX 451.

Based on a first index, indicators that associate each processor of a SIMD array to a member of the array of neural network input values are retrieved (504). For example, based on index 491, control values 481 may be retrieved from source address table memory 480. Control values 481 represent associations between individual input values from MUX 451 to individual processors 411-414.

Based on the indicator that associate each process of the SIMD array to a member of the array of neural network input values, a crossbar is configured to provide respective members of the array of neural network input values to the respective associated processor of the SIMD processor array (506). For example, control values 481 may be applied to crossbar 450 to configure crossbar 450. This configuration provides individual input values from MUX 451 to each processor 411-414.

Based on a second index, coefficient values associated with each processor of the SIMD array are retrieved (508). For example, based on index 492, weight values 435 may be retrieved from coefficient memory 430. By each processor of the SIMD array, the coefficient value associated with that processor is multiplied with the neural network input value associated with that processor and accumulate the respective results (510). For example, processors 411-414 of SIMD array 410 may each multiply the neural network input value received from crossbar 450 with the coefficient value received from coefficient memory 430. After this multiplication, processors 411-414 may accumulate the result with a value in a register (or other storage).

The accumulated results are provided to be used as a second array of neural network input values (512). For example, the accumulated values calculated by processors 411-414 may be stored in local register 421 so that they may later be used as input values (after being pass through MUX 451 and crossbar 450) to processors 411-414.

Figure 6:
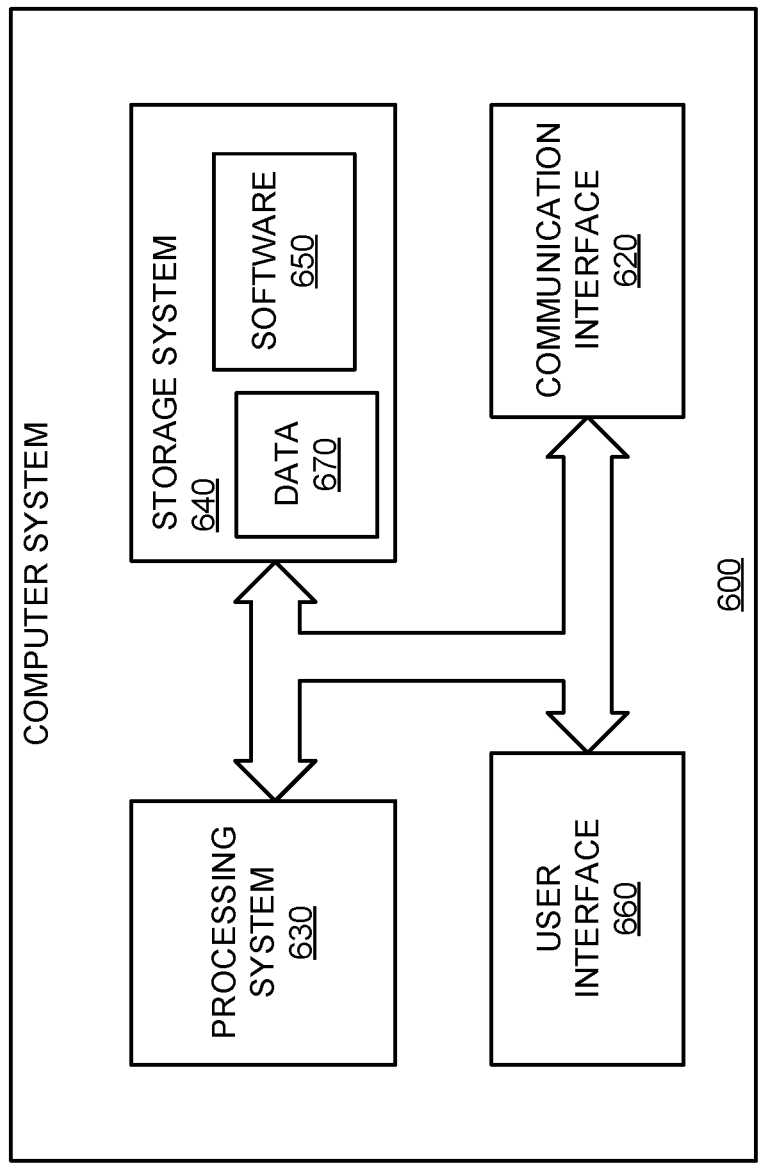
FIG. 6 is a block diagram of a computer system.

FIG. 6 illustrates a block diagram of an example computer system. In an embodiment, computer system 600 and/or its components include circuits, software, and/or data that implement, or are used to implement, the methods, systems and/or devices illustrated in the Figures, the corresponding discussions of the Figures, and/or are otherwise taught herein.

The methods, systems and devices described herein may be implemented in computer systems, or stored by computer systems. The methods described above may also be stored on a non-transitory computer readable medium. Devices, circuits, and systems described herein may be implemented using computer-aided design tools available in the art, and embodied by computer-readable files containing software descriptions of such circuits. This includes, but is not limited to one or more elements of system 100, system 200, and/or system 400, and their components. These software descriptions may be: behavioral, register transfer, logic component, transistor, and layout geometry-level descriptions.

Data formats in which such descriptions may be implemented are stored on a non-transitory computer readable medium include, but are not limited to: formats supporting behavioral languages like C, formats supporting register transfer level (RTL) languages like Verilog and VHDL, formats supporting geometry description languages (such as GDSII, GDSIII, GDSIV, CIF, and MEBES), and other suitable formats and languages. Physical files may be implemented on non-transitory machine-readable media such as: 4 mm magnetic tape, 8 mm magnetic tape, 3½-inch floppy media, CDs, DVDs, hard disk drives, solid-state disk drives, solid-state memory, flash drives, and so on.

Alternatively, or in addition, the functionally described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), multi-core processors, graphics processing units (GPUs), etc.

FIG. 6 is a block diagram of a computer system. In an embodiment, computer system 600 and/or its components include circuits, software, and/or data that implement, or are used to implement, the methods, systems and/or devices illustrated in the Figures, the corresponding discussions of the Figures, and/or are otherwise taught herein.

Computer system 600 includes communication interface 620, processing system 630, storage system 640, and user interface 660. Processing system 630 is operatively coupled to storage system 640. Storage system 640 stores software 650 and data 670. Processing system 630 is operatively coupled to communication interface 620 and user interface 660. Storage system 640 and/or communication interface 620 are examples of a subsystems that may include system 100, system 200, system 400, and/or their components.

Computer system 600 may comprise a programmed general-purpose computer. Computer system 600 may include a microprocessor. Computer system 600 may comprise programmable or special purpose circuitry. Computer system 600 may be distributed among multiple devices, processors, storage, and/or interfaces that together comprise elements 620-670.

Implementations discussed herein include, but are not limited to, the following examples:

Example 1

An integrated circuit, comprising: an N-way single-instruction multiple data (SIMD) array of processors where each processor of the array includes a multiply-accumulate unit having a respective accumulator; and, a crossbar to provide a respective selected neural network input value to each of the N processors, the N number of selected neural network input values selected from M number of input values.

Example 2

The integrated circuit of example 1, wherein M>N.

Example 3

The integrated circuit of example 1, further comprising: an instruction memory to provide a first index to address a first memory, the respective input value provided to each of the N processors being based on the output of the first memory.

Example 4

The integrated circuit of example 3, wherein the instruction memory to also provide a second index to address a second memory, a respective coefficient value to be provided to each of the N processors being based on the output of the second memory.

Example 5

The integrated circuit of example 1, wherein the N-way SIMD array of processors can be configured to operate using X number of processors, where N>X.

Example 6

The integrated circuit of example 1, wherein the neural network input values include respective values from the SIMD array of processors.

Example 7

A method of computing, in parallel, a plurality of neuron outputs of a neural network, comprising: receiving a plurality of neural network input values; providing, from a first memory and based on a first index, a first plurality of neural network weights to a corresponding plurality of multiply-accumulate units; receiving, from a second memory and based on a second index, a plurality of crossbar control values that associate each of the plurality of neural network input values to the respective ones of the plurality of multiply-accumulate units; based on the plurality of crossbar control values, providing the plurality of neural network input values to the to the respective ones of the plurality of multiply-accumulate units; performing, in parallel and by the plurality of multiply-accumulate units, respective multiply-accumulate operations using the respective first plurality of neural network weights and the respective plurality of neural network input values.

Example 8

The method of example 7, further comprising: receiving, from an instruction memory, the first index.

Example 9

The method of example 7, further comprising: receiving, from an instruction memory, the second index.

Example 10

The method of example 7, wherein the first index and the second index are associated with an instruction by an instruction memory.

Example 11

The method of example 7, further comprising: controlling the multiply-accumulate units to provide neuron outputs.

Example 12

The method of example 11, wherein the neuron outputs are based on respective multiply-accumulate operations.

Example 13

The method of example 11, wherein the multiply-accumulate operations produce respective accumulated values and the neuron outputs are based on a non-linear activation function.

Example 14

An integrated circuit, comprising: a plurality of multiply-accumulate units to receive respective first operands and respective second operands; a first memory to provide, based on a first index, a corresponding plurality of respective second operands to the plurality of multiply-accumulate units; a crossbar to provide a corresponding plurality of respective first operands to the plurality of multiply-accumulate units; a second memory to control, based on a second index, the crossbar to provide, from a plurality of sources, the corresponding plurality of respective first operands to the plurality of multiply-accumulate units.

Example 15

The integrated circuit of example 14, further comprising: a third memory to provide a plurality of first indexes to the first memory.

Example 16

The integrated circuit of example 14, further comprising: a third memory to provide a plurality of second indexes to the second memory.

Example 17

The integrated circuit of example 13, further comprising: a third memory to provide a plurality of first indexes to the first memory and a plurality of second indexes to the second memory.

Example 18

The integrated circuit of example 17, wherein the third memory also determines whether the plurality of multiply-accumulate units perform multiply-accumulate operations.

Example 19

The integrated circuit of example 17, wherein the third memory also determines a number of the plurality of multiply-accumulate units that are to perform multiply-accumulate operations.

Example 20

The integrated circuit of example 19, further comprising: at least one register to store corresponding plurality multiply-accumulate results from the plurality of multiply-accumulate units.

The foregoing descriptions of the disclosed embodiments have been presented for purposes of illustration and description. They are not intended to be exhaustive or to limit the scope of the claimed subject matter to the precise form(s) disclosed, and other modifications and variations may be possible in light of the above teachings. The embodiments were chosen and described in order to best explain the principles of the disclosed embodiments and their practical application to thereby enable others skilled in the art to best utilize the various embodiments and various modifications as are suited to the particular use contemplated. It is intended that the appended claims be construed to include other alternative embodiments except insofar as limited by the prior art.

What is claimed is:
1. A device comprising:
an integrated circuit including:
an N-way single-instruction multiple data (SIMD) array of a plurality of processors where each processor of the array includes a multiply-accumulate unit having a respective accumulator; and
a crossbar to provide a respective selected neural network input value to each of the N processors, the

N number of selected neural network input values selected from M number of input values, wherein M is greater than N.

2. The device of claim 1, wherein the integrated circuit further includes:
an instruction memory to provide a first index to address a first memory, the respective input value provided to each of the N processors being based on the output of the first memory.

3. The device of claim 2, wherein the instruction memory to also provide a second index to address a second memory, a respective coefficient value to be provided to each of the N processors being based on the output of the second memory.

4. The device of claim 1, wherein the N-way SIMD array of processors can be configured to operate using X number of processors, where N>X.

5. The device of claim 1, wherein the neural network input values include respective values from the SIMD array of processors.

6. A method of computing, in parallel, a plurality of neuron outputs of a neural network, comprising:
receiving a plurality of neural network input values;
providing, from a first memory and based on a first index, a first plurality of neural network weights to a corresponding plurality of multiply-accumulate units;
receiving, from a second memory and based on a second index, a plurality of crossbar control values that associate each of the plurality of neural network input values to the respective ones of the plurality of multiply-accumulate units;
based on the plurality of crossbar control values, providing the plurality of neural network input values to the to the respective ones of the plurality of multiply-accumulate units; and
performing, in parallel and by the plurality of multiply-accumulate units, respective multiply-accumulate operations using the respective first plurality of neural network weights and the respective plurality of neural network input values;
wherein the first index or the second index is associated with an instruction by an instruction memory.

7. The method of claim 6, wherein the first index is associated with the instruction by the instruction memory; and
wherein the method further comprises receiving the first index from the instruction memory.

8. The method of claim 6, wherein the second index is associated with the instruction by the instruction memory; and
wherein the method further comprises receiving the second index from the instruction memory.

9. The method of claim 6, wherein the first index and the second index are associated with the instruction by the instruction memory.

10. The method of claim 6, further comprising:
controlling the multiply-accumulate units to provide neuron outputs.

11. The method of claim 10, wherein the neuron outputs are based on respective multiply-accumulate operations.

12. The method of claim 10, wherein the multiply-accumulate operations produce respective accumulated values and the neuron outputs are based on a non-linear activation function.

13. A device comprising:
an integrated circuit including:
a plurality of multiply-accumulate units to receive respective first operands and respective second operands;
a first memory to provide, based on a first index, a corresponding plurality of respective second operands to the plurality of multiply-accumulate units;
a crossbar to provide a corresponding plurality of respective first operands to the plurality of multiply-accumulate units;
a second memory to control, based on a second index, the crossbar to provide, from a plurality of sources, the corresponding plurality of respective first operands to the plurality of multiply-accumulate units; and
a third memory to provide a plurality of first indexes to the first memory or a plurality of second indexes to the second memory.

14. The device of claim 13,
wherein the third memory is included to provide the plurality of first indexes to the first memory.

15. The device of claim 13,
wherein the third memory is included to provide the plurality of second indexes to the second memory.

16. The device of claim 13,
wherein the third memory is included to provide the plurality of first indexes to the first memory and the plurality of second indexes to the second memory.

17. The device of claim 16, wherein the third memory also determines whether the plurality of multiply-accumulate units perform multiply-accumulate operations.

18. The device of claim 16, wherein the third memory also determines a number of the plurality of multiply-accumulate units that are to perform multiply-accumulate operations.

19. The device of claim 18, further wherein the integrated circuit further includes:
at least one register to store corresponding plurality multiply-accumulate results from the plurality of multiply-accumulate units.

* * * * *